US005628272A

United States Patent [19]
Thomas

[11] Patent Number: 5,628,272
[45] Date of Patent: May 13, 1997

[54] PIVOTABLE THRUST VECTORING TRANSOM PANEL

[75] Inventor: Mark A. Thomas, San Jose, Calif.

[73] Assignee: United Defense, L.P., Arlington, Va.

[21] Appl. No.: 705,028

[22] Filed: Aug. 29, 1996

Related U.S. Application Data

[63] Continuation of Ser. No. 595,943, Feb. 6, 1996, Pat. No. 5,579,711.

[51] Int. Cl.⁶ ........................................................ B63B 1/22
[52] U.S. Cl. ................................ 114/285; 114/270; 440/38
[58] Field of Search .................................... 114/284, 285, 114/286, 270; 440/38

[56] References Cited

U.S. PATENT DOCUMENTS 3,420,204  1/1969  Samuel .
3,809,005  5/1974  Rodler, Jr. .
3,983,832  10/1976  Kinder .
4,073,257  2/1978  Rodler, Jr. .
4,953,492  9/1990  Duffty .................................... 114/282

Primary Examiner—Jesus D. Sotelo
Attorney, Agent, or Firm—Douglas W. Rudy; Michael B. K. Lee

[57]  ABSTRACT

A transom flap can be deployed from the transom of an amphibious vehicle when the vessel is water borne. The transom flap is pivotally mounted and can be extended to extend into a position relatively acute to the transom of the vessel the transom flap can be extended to impinge the propulsion jet of a jet propulsion drive system of the vessel or it can be deployed to extend out of the jet stream but at a less acute angle such that it will be helpful in trim adjustment of the vessel at speed.

8 Claims, 2 Drawing Sheets

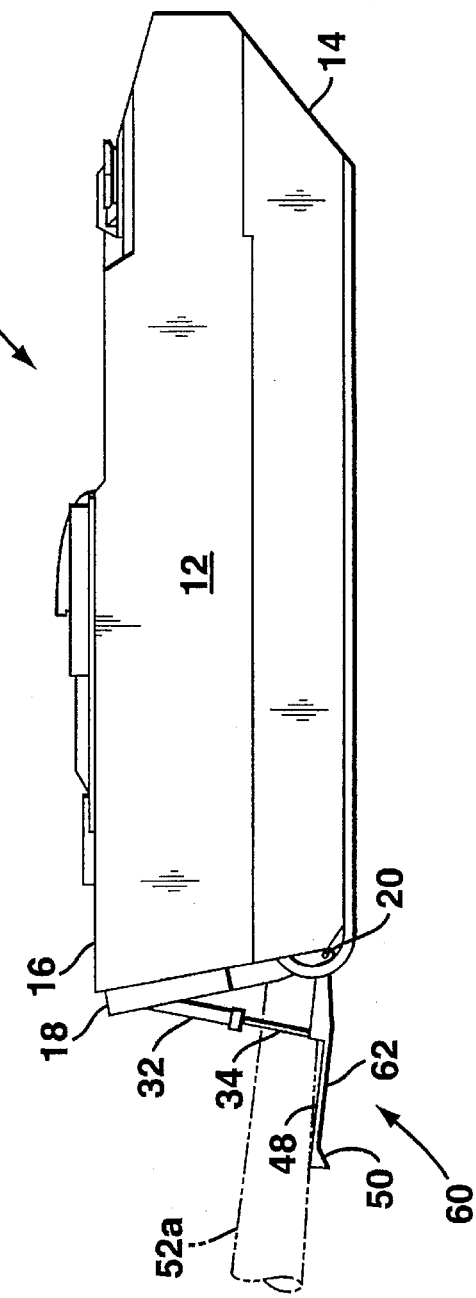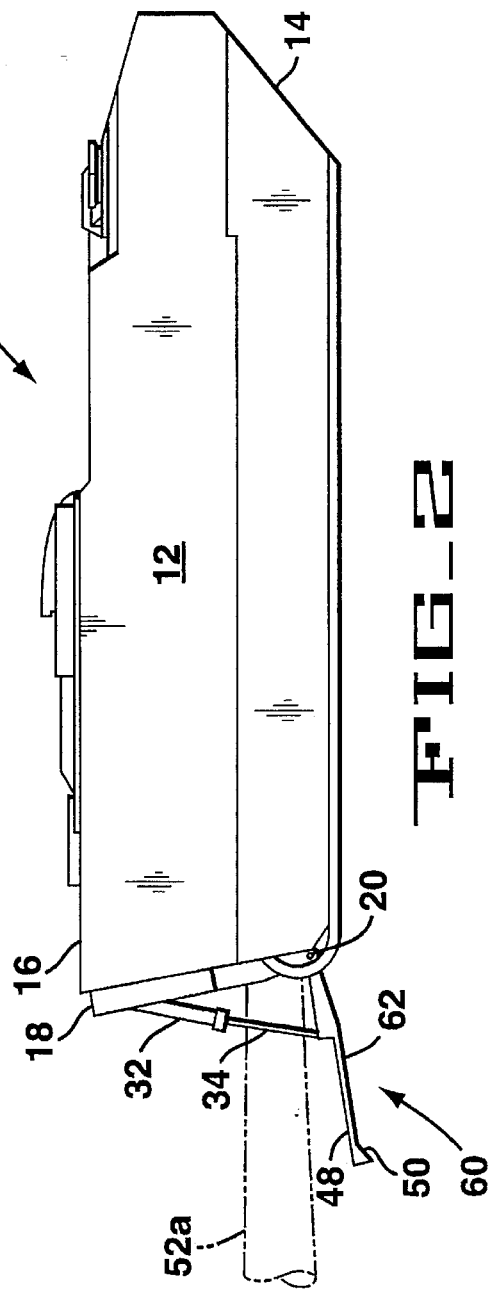

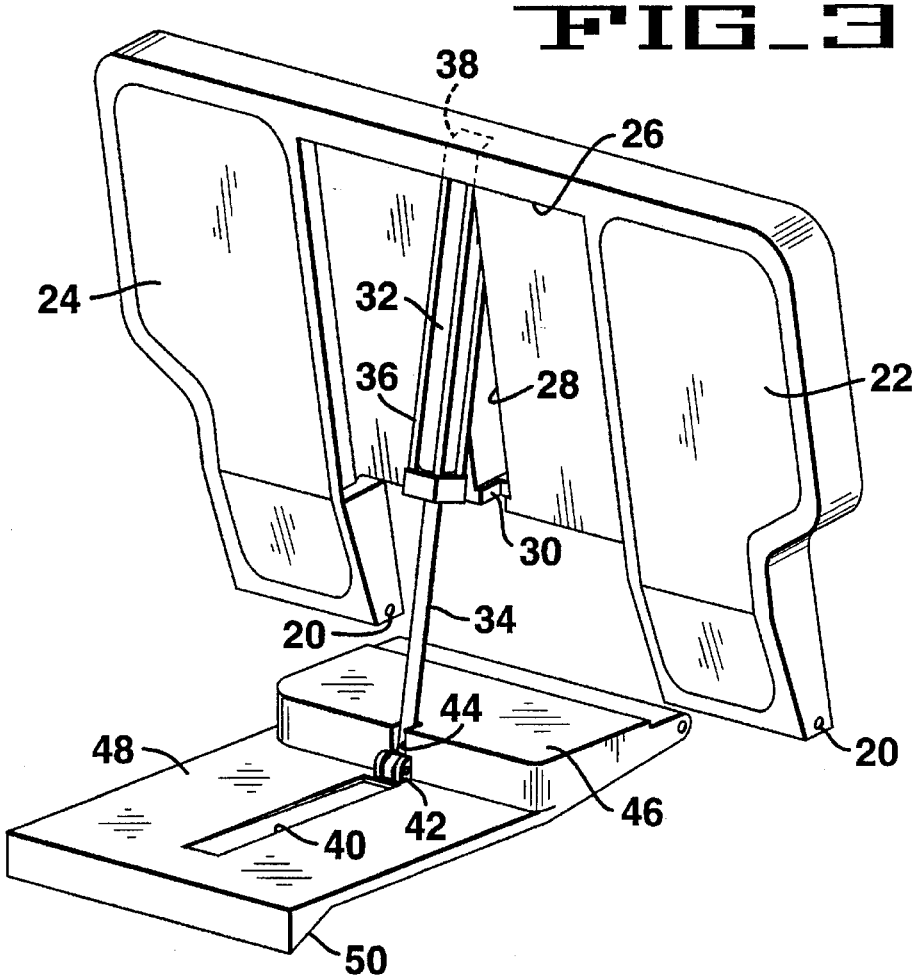
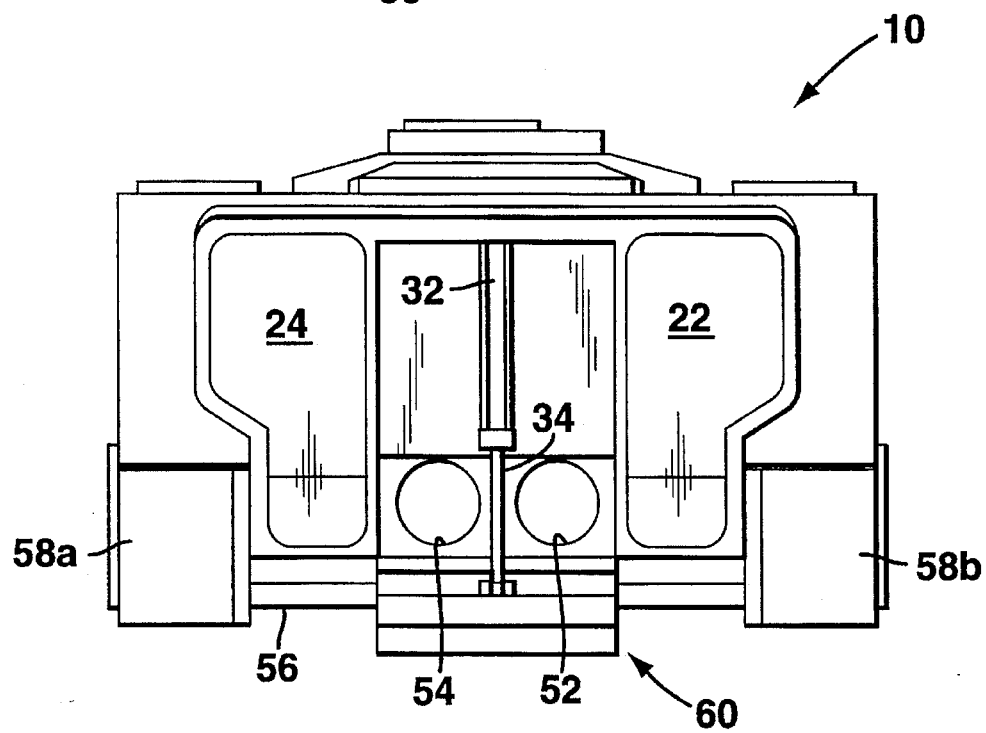

PIVOTABLE THRUST VECTORING TRANSOM PANEL

This application is a continuation of application Ser. No. 08/595,943, filed Feb. 6, 1996, now U.S. Pat. No. 5,579,711.

BACKGROUND OF THE INVENTION

1. Field of the Invention

This invention has to do with amphibious craft having the capability to travel on land and on sea. The invention pertains to a pivoting transom or ramp having multiple pivoting sections, one section of which is used when the craft is operating as a watercraft to enhance the vehicle trim capabilities and pitch control of the craft as it is underway and water borne.

A transom flap or transom panel is deployable such that it performs functions related to the trim of the craft. Trim control is important in planing modes of operation as well as during the time when the craft is accelerating to planing speed.

2. Description of the Prior Art

It is well know in prior art to use trim tabs and other related transom mounted panel and planing devices on watercraft to assist in adjusting the trim of the vessel along its minor axis by controlling the lift at the stem of the boat. Such trim tabs are known to enhance the performance of the watercraft by raising or lowering the bow of the craft to achieve optimum boat speed. This is beneficial in attaining maximum boat speed as well as maximum hull efficiency. The drag reduction resulting from the use of trim tabs is the primary benefit of their use however trim tabs also result in a smoother ride and a reduction of water spray generated by the hull.

Trim tabs, mounted to the stem of the host craft, rely solely on boat speed to generate the lift needed to affect the trim of the vessel. At speed the trim tabs may allow the host watercraft to attain speeds that exceed the fundamental hull speed of the boat.

It has been known to use a waterjet nozzle mounted jet stream deflector for trim control. Waterjet mounted trim control systems require significant hardware, i.e. pumps, motors and plumbing to be effective. The complexity and increased waterjet length of prior art devices is inefficient when compared to the thrust vectoring embodiment of the invention disclosed herein.

SUMMARY OF THE INVENTION

This invention is a flap or panel that is used on the hinged transom door or ramp of an amphibious vehicle. The transom or ramp is hinged at the base and is normally held in an upright and locked position when the craft is water borne. The transom flap or panel however is in a deployed position such that it extends outwardly from the transom door or ramp at a nominal right angle when the watercraft is being accelerated or is at speed in the water.

The transom flap is adjustably mounted by means of a hinge connection at the bottom of the transom flap and a supporting hydraulic or pneumatic actuating cylinder intermediate the top and bottom of the transom flap.

The adjustability of the transom flap will allow it to be moved to various positions ranging from either a fully extended cylinder rod position to a position where the propulsion stream of water, referred to as "waterjets" herein, used to drive the vehicle impinges against the interior surface of the panel to thereby affect the trim of the vessel to raise its bow. The transom flap presented here can generate lifting force similar to the force generated by trim tabs and the transom flaps can generate down force independent of watercraft speed by vectoring waterjet thrust up.

One of the advantages of the invention is that the transom flap has the ability to vector the propulsor or waterjet thrust up and provide lift for planing. It should be pointed out that the pair of waterjets used by the watercraft are the primary propulsion force used to propel the watercraft when water borne.

One of the objects of the invention is to provide control of bow plow-in while operating the watercraft as a displacement craft at speeds greater than fundamental hull speed. Another object is to provide pitch control to compensate for varying sea conditions by up-vectoring the waterjet thrust to raise the bow and operate without taking water over the bow.

One further object of the invention is to provide increased planing surface area to the vessel by means of the deployable transom flap while also increasing lift at the stern of the craft through the use of a lift enhancing wedge at the trailing end of the transom flap.

Another object of the invention is to provide a ballistic barrier in the ramp of an amphibious vehicle to enhance protection when the craft is operating on land.

BRIEF DESCRIPTION OF THE DRAWINGS

The invention is clearly set out in the drawing figures in which:

FIG. 1 is a side elevation view of the vessel incorporation the transom flap which is shown in a partially extended deployment;

FIG. 2 is the same view as FIG. 1 but showing the transom flap extended out of the path of the propulsion stream;

FIG. 3 is a representation of a transom door and the transom flap shown deployed away from the door;

FIG. 4 is a view from the rear of the vessel showing the transom flap deployed as it would be when the vessel is at sea.

DESCRIPTION OF THE PREFERRED EMBODIMENT

The invention can be most easily envisioned when looking at FIG. 3 in combination with FIG. 1.

FIG. 1 shows the vessel, generally 10, which includes a hull 12, a bow portion 14 and a stern portion 16 as is usual for water craft. The vessel shown is an amphibious craft that is equipped with tracks for supporting and driving the vehicle on land surfaces and is equipped with a water jet propulsion drive for propelling the vessel when the craft is water borne.

The invention is housed in, or more properly, is a part of, the transom or ramp 18 which is pivotally connected for instance at pivot point 20 to the hull of the craft 12. The transom or ramp 18 is pivotally lowerable about the pivot point provided to provide man access to the interior of the craft and to allow quick loading and unloading. In transport modes both on land and in water the transom or ramp may be positively latched in a closed position as shown in FIGS. 1, 2 and 3.

The transom may include doors such as 22 and 24 to allow access to compartments behind these doors. A frame such as 26 defines a cavity in the transom or ramp where the transom flap will be stowed when the transom or ramp is closed and the vehicle is operating on land. Inside the cavity defined by frame 26 there is formed a second cavity 28, bounded at an end thereof which includes a hydraulic cylinder stabilizer collar 30, into which a hydraulic cylinder will be stowed when the transom flap is closed.

The hydraulic actuator 32 includes a rod portion 34 that is extendible in a known manner into and out of the hydraulic cylinder 36. The hydraulic actuator would be pivotally mounted at the upper end thereof, 38, through a bracket (not shown) to the frame 26 of the transom or ramp. The rod end of the hydraulic actuator would be pivotally mounted by means of a lug to the interior side of the transom flap at the pivot point provided by tab arrangement 42. A rod accommodating cutout 44 in a raised portion 46 of the interior of the transom flap allows the transom flap to be pivoted to a deployment more than generally a right angle from the transom. The preferred embodiment for the actuator is hydraulically controlled actuation however other types of actuators, such as pneumatic actuators are contemplated by the inventor.

The raised portion 46, for filling a propulsor opening or port in the transom or ramp, is stepped up from the normal surface 48 of the interior of the transom flap. A hydraulic actuator accommodating recess 40 is formed on the interior surface of the transom flap to accommodate the hydraulic cylinder when the transom flap is stowed in the closed transom or ramp when the vessel is in the on-land operating mode.

The obverse side of the transom flap is a generally flat ballistic surface. It may include a lift enhancing or lift increasing wedge portion 50 at the relative upper end thereof used to enhance the trimming effect by increasing the lift of the transom flap when the transom flap is deployed to a water contacting condition.

The preferred embodiment of a transom flap is not as wide as the width of the vehicle. It has been found that a narrow transom flaps which are between fifty and eighty percent of the width of the vehicle are better performers then full width transom flaps. The width ratio of the transom flap to hull width is about fifty five percent in the preferred embodiment shown.

Turning now to FIGS. 1, 2 and 4 the propulsion jets, the up-vectoring aspect of the jet thrust, and the method by which the transom flap is used to trim the vessel and provide pitch control when at sea will be described.

In FIG. 4 one port for the exhaust of the propulsion jet is shown as item 52. A second propulsion waterjet port is shown as 54. A high pressure stream of water, shown as 52a in FIGS. 1 and 2 will be driven out these outlet ports to drive and provide propulsive force to move the vessel, generally 10, through the water. Reference numeral 56 indicates the lower hull surface of the hull 12. The lower hull surface is the exterior surface that provides the main planing surface of the vessel when on the water. Items 58a and 58b shown in FIG. 4 are the covered tracks of the vehicle. The vehicle tracks are covered with generally smooth surfaced panels when the craft is operating as a watercraft.

In FIG. 2 the hydraulic actuator, comprised of the cylinder 32 and the rod 34, is extended such that the transom flap, generally 60, is positioned to be below the water propulsion jet 52a. In this deployment the surface 62 will impact on the water flowing off the surface 56 of the lower hull and will cause the bow 14 of the vessel to be lowered with the goal being that the vessel will level out on a plane as soon as possible after acceleration on the water. Once the vessel is on a plane the transom flap will be adjusted by means of the hydraulic actuator to trim the vessel for optimum speed on the water and at a maximized efficiency for that particular speed.

In Fig. 1 the deployment of the transom flap, generally 60, is such that it will allow the inboard surface 48 of the transom flap to contact the waterjet 52a as shown. In this displacement the waterjet acting on the surface will cause pressure build up on the transom flap and the bow of the craft will be raised higher out of the water. As the transom flap is raised even higher thereby decreasing the angle between the transom flap and the transom the bow will be raised more. This transom flap displacement will be helpful in shifting the horizontal attitude or pitch of the watercraft when the vessel is accelerating up to planing speed. Generally, once the vessel approaches planing speed the transom flap will be adjusted for optimum trim and it is expected that the waterjet will no longer need to contact the inner surface of the transom flap.

The foregoing description, when read in conjunction with a perusal of the drawing figures, shows how the implementation of a wide, deep adjustable transom flap can be and is used to met the objects of the invention. The following claims seek to protect the inventor's idea by claiming the transom flap principle in a manner that captures the spirit of the invention. Minor deviations and nuances of the invention are contemplated as being covered by the following claims.

What is claimed is:

1. A transom flap for use on an amphibious vessel comprising:

a transom having at least a single port through said transom;

said transom flap pivotally attached to said transom capable of substantially closing said port, said transom flap further being capable of deployment to a position extending outwardly from said hull structure to open said port;

waterjet propulsion system carried by said vessel, said system having at least a single waterjet propulsion outlet directed to deliver water through said port of said transom;

means to position said transom flap to impinge said waterjet and deflect said waterjet from its normal path, whereby said impingement of said waterjet on said transom flap will cause an attitude change in said vessel controllable by the degree of incidence said transom flap presents to said waterjet.

2. The invention in accordance with claim 1 wherein said transom flap pivotally connected to said transom is pivoted by means of actuator means connected to said vessel and to said transom flap.

3. The invention in accordance with claim 2 wherein said transom flap is at least fifty percent as wide as said hull of said vessel.

4. The invention in accordance with claim 1 wherein said transom flap has a surface obverse to the surface said waterjet may impinge upon, said obverse surface having a tab means for improving lift of said transom flap when said transom flap is deployed to a position wherein said tab can contact the surface of the water supporting said vessel.

5. The invention in accordance with claim 1 wherein impingement of said waterjets on said transom flap impingement surface will result in trim adjustment of said vessel.

6. The invention in accordance with claim 5 wherein a pair of waterjets are used to propel said vehicle.

7. The invention in accordance with claim 6 wherein propulsion by a single waterjet on said impingement surface of said transom flap will result in a rotational movement about the major axis of said vessel as well as a torsional movement transverse to said major axis of said vessel.

8. The invention in accordance with claim 1 wherein said transom flap obverse surface is a ballistic surface.

* * * * *